United States Patent
Nakic et al.

(10) Patent No.: US 10,735,426 B2
(45) Date of Patent: Aug. 4, 2020

(54) SECURE ASYNCHRONOUS RETRIEVAL OF DATA BEHIND A FIREWALL

(71) Applicant: salesforce.com, inc., San Francisco, CA (US)

(72) Inventors: Jasmin Nakic, Sunnyvale, CA (US); Samir Pilipovic, Santa Clara, CA (US)

(73) Assignee: salesforce.com, inc., San Francisco, CA (US)

( * ) Notice: Subject to any disclaimer, the term of this patent is extended or adjusted under 35 U.S.C. 154(b) by 444 days.

(21) Appl. No.: 15/428,880

(22) Filed: Feb. 9, 2017

(65) Prior Publication Data

US 2018/0227300 A1 Aug. 9, 2018

(51) Int. Cl.
*G06F 7/04* (2006.01)
*H04L 29/06* (2006.01)

(52) U.S. Cl.
CPC ............ *H04L 63/10* (2013.01); *H04L 63/029* (2013.01); *H04L 63/0442* (2013.01)

(58) Field of Classification Search
CPC ............ G06F 21/6209; G06F 21/6218; G06F 2221/2111; G06F 2221/2115; H04L 2209/60; H04L 9/321; H04L 63/0281; H04L 63/0442; H04L 63/10; H04L 63/029
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

FOREIGN PATENT DOCUMENTS

WO     WO 03/021464 A2 *    3/2003      ............ G06F 15/16

*Primary Examiner* — Farid Homayounmehr
*Assistant Examiner* — Lizbeth Torres-Diaz
(74) *Attorney, Agent, or Firm* — LKGlobal | Lorenz & Kopf, LLP

(57) ABSTRACT

Computing systems and related methods are provided for retrieving data residing behind a firewall. One exemplary method involves a server receiving a first request from a data transfer client, maintaining the first request in a first queue of requests associated with a data transfer agent coupled to the network via a firewall, and providing the first request from the first queue to the data transfer agent in response to a second request received from the data transfer agent. The server receives a first response from the data transfer agent, maintains the first response in a second queue of responses associated with the data transfer client, and provides the first response from the second queue to the data transfer client in response to a third request received from the data transfer client.

18 Claims, 6 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,627,658 B2 * | 12/2009 | Levett .................. G06F 9/46 709/203 |
| 7,630,986 B1 * | 12/2009 | Herz .................. G06Q 10/10 |
| 7,698,160 B2 | 4/2010 | Beaven et al. |
| 7,779,475 B2 | 8/2010 | Jakobson et al. |
| 8,011,001 B2 * | 8/2011 | Suh .................. H04L 9/3271 726/12 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,291,039 B2 * | 10/2012 | Shedrinsky ......... H04L 63/0281 709/217 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,751,826 B2 * | 6/2014 | O'Connor ............. H04L 9/0894 380/278 |
| 8,799,641 B1 * | 8/2014 | Seidenberg ......... H04L 63/0876 713/153 |
| 8,806,636 B2 * | 8/2014 | Okamura ............. H04L 63/1433 726/22 |
| 8,849,902 B2 * | 9/2014 | Fiatal ...................... H04L 67/42 709/203 |
| 8,850,200 B1 * | 9/2014 | Horgan ............... H04L 63/0428 380/277 |
| 9,203,815 B1 * | 12/2015 | Bogorad ............... G06F 21/604 |
| 9,436,841 B2 | 9/2016 | O'Connor et al. |
| 9,928,379 B1 * | 3/2018 | Hoffer .................. G06F 21/6245 |
| 10,142,301 B1 * | 11/2018 | Sharifi Mehr ...... H04L 63/0478 |
| 2001/0037464 A1 * | 11/2001 | Persels ..................... H04L 51/30 726/5 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120610 A1 * | 6/2003 | Hamber ................. G06Q 30/06 705/67 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0153537 A1 * | 8/2004 | Rezvani ............... H04L 67/2842 709/223 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 * | 1/2006 | Hinton ..................... G06F 21/41 726/10 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |

(56) References Cited

U.S. PATENT DOCUMENTS

| | | | |
|---|---|---|---|
| 2010/0257351 A1* | 10/2010 | O'Connor | H04L 9/0894 |
| | | | 713/150 |
| 2011/0247051 A1 | 10/2011 | Bulumulla et al. | |
| 2011/0276900 A1* | 11/2011 | Khan | H04L 67/38 |
| | | | 715/753 |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2013/0007106 A1* | 1/2013 | Tobin | G06F 3/0484 |
| | | | 709/203 |
| 2013/0007239 A1* | 1/2013 | Agarwal | H04L 29/08 |
| | | | 709/223 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1* | 9/2013 | Cinarkaya | H04L 67/02 |
| | | | 726/27 |
| 2013/0297932 A1* | 11/2013 | Redmond | H04L 67/101 |
| | | | 713/155 |
| 2014/0201084 A1* | 7/2014 | Dagenais | H04L 63/0464 |
| | | | 705/64 |
| 2015/0163206 A1* | 6/2015 | McCarthy | G06F 21/10 |
| | | | 713/171 |
| 2017/0041296 A1* | 2/2017 | Ford | H04W 12/06 |

* cited by examiner

SECURE ASYNCHRONOUS RETRIEVAL OF DATA BEHIND A FIREWALL

TECHNICAL FIELD

Embodiments of the subject matter described herein relate generally to computer systems, and more particularly, to methods and systems for securely accessing data behind a firewall with reduced latency and overhead.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like).

One problem faced by developers of an on-demand system is providing secure access to data stored at a different location that is secured from the rest of the network, such as, for example, legacy data residing behind a firewall. Existing solutions typically suffer from undesirable latency, delay, or other overhead, or present potential vulnerabilities. Moreover, the problems associated with existing solutions are exacerbated as the amount of requests for data transfer increase. Accordingly, it is desirable to provide systems and methods for accessing firewalled legacy data efficiently and without compromising security.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
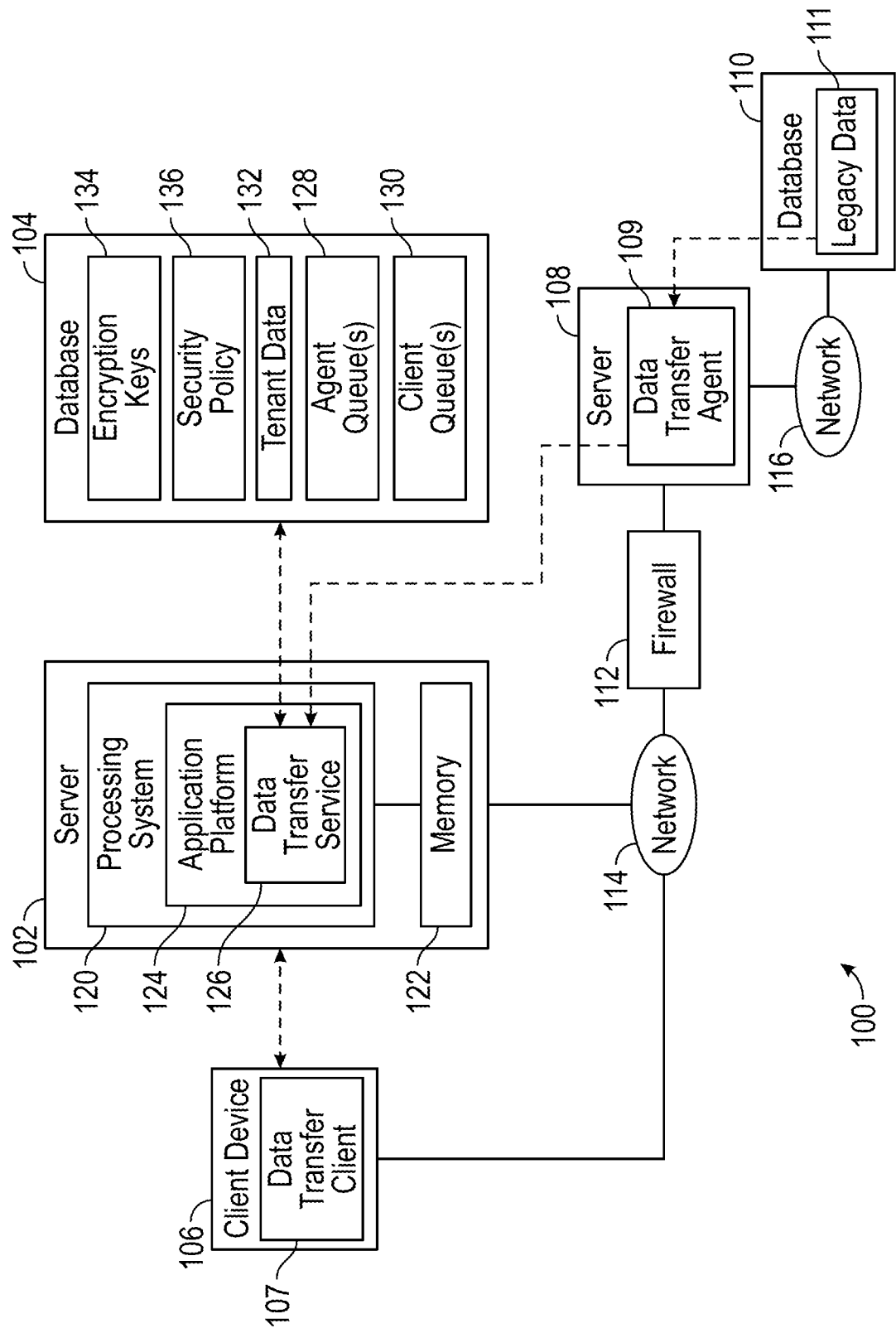
FIG. 1 is a block diagram of an exemplary computing system.

Embodiments of the subject matter described herein generally relate to methods and systems for transferring requests for data and corresponding responses between entities on different sides of a security barrier, such as a firewall. It should be noted that although one or more embodiments may be described herein in the context of a virtual application in a database system, the subject matter is not necessarily so limited, and in practice, may be implemented in an equivalent manner in any number of different application systems, on-demand systems, cloud computing systems, and the like.

Exemplary embodiments described herein employ a request-based (or request-initiated) protocol for passing encrypted queries and data between endpoint entities via an intermediary entity that supports or otherwise provides a data transfer service. In this regard, a requesting entity (e.g., a device or application) provides encrypted requests for legacy data behind a firewall or other security barrier, and the encrypted requests are maintained at the intermediary entity in a queue associated with the destination entity residing behind the firewall and from which the legacy data is being requested. The encrypted requests are provided from the queue to the destination entity in response to requests received from the destination entity, thereby allowing the requests to pass through the firewall in their encrypted form. The data requests can then be decrypted, authorized, and executed at the entity behind the firewall (or alternatively, the firewalled entity) to retrieve or otherwise obtain the requested legacy data. Thereafter, the firewalled entity encrypts the retrieved legacy data and provides the encrypted response to the intermediary entity via the firewall. The encrypted responses are maintained at the intermediary entity in a queue associated with the entity that initiated the request for the data, and the encrypted responses are provided from that queue to the requesting entity in response to a request received from the requesting entity, which then decrypts the response to access the requested legacy data.

By virtue of the data transfers through the firewall initiating from the firewalled entity, the existing firewall configuration can be maintained, which avoids costs or overhead associated with special firewall configurations and does not introduce potential vulnerabilities or increase susceptibility of the firewall to attacks. Requests for data and corresponding responses are also maintained encrypted throughout the transfer, thereby ensuring data security. Additionally, by virtue of the asynchronous pushing and pulling of requests and responses to/from the intermediary, computing resources of the requesting may be released for other tasks while a request is being executed. Latencies may also be reduced by leveraging queueing technology, which also allows the requests and responses to persist encrypted at the intermediary until pulled or otherwise retrieved by the respective entity associated with the queue. Bulk data transfers may also be achieved (e.g., by a firewalled device retrieving and executing multiple requests at a time), which, in turn, increases the bandwidth of data transfer through the firewall. For example, polling for data transfer requests or responses can occur as processing resources become available, and multiple requests or responses can be transmitted concurrently or as otherwise part of a common communications session.

In one or more embodiments, the intermediary also supports cryptographic key exchanges, for example, by storing or otherwise maintaining public keys associated with respective entities involved in the data transfer, thereby allowing public keys to be exchanged without requiring a requesting entity communicating via the firewall. Additionally, security policy information, such as authorization information, authentication information, and/or other access control information may also be stored or otherwise maintained by the intermediary in a manner that allows the security policy information to be retrieved by the firewalled entity to enforce data security policies with respect to requests prior to execution. At the same time, maintaining the security policy information in front of the firewall allows for the security policy information to be updated or modified without communications through the firewall.

As described in greater detail below, in exemplary embodiments, a data transfer agent executes on a computing device that is behind a firewall and logically separated from a network, such as the Internet. A data transfer service functioning as an intermediary executes on another device on the network and utilizes a database or similar data storage element to maintain queue of requests intended for the data transfer agent. The data transfer service receives requests intended for the data transfer agent (which may be encrypted) from data transfer clients on the network and maintains those requests in the appropriate queue associated with the destination data transfer agent. The data transfer agent periodically or asynchronously polls the data transfer service for requests independent of when they are received at the data transfer service, and the data transfer service provides requests from the queue in response to the polling in a first-in first-out (FIFO) manner. By virtue of the communication with the data transfer agent being initiated by the data transfer agent, the requests can be transmitted back to the data transfer agent through the firewall without requiring any reconfiguration of the firewall.

The data transfer agent decrypts the requests obtained from its queue, authorizes them, and then executes them as appropriate to retrieve requested legacy data from a database or similar data storage element residing behind the firewall. In this regard, the data transfer agent may obtain cryptographic keys and/or other authorization information associated with the request (or the data transfer client initiating the request) from the data transfer service and utilize that information to decrypt and authorize the request, as described in greater detail below. The retrieved legacy data may then be encrypted by the data transfer agent using a cryptographic key associated with the data transfer client and transmitted back to the data transfer service, which then maintains the encrypted response in a queue of responses intended for the data transfer client. The data transfer client periodically or asynchronously polls the data transfer service for responses independent of when they are received at the data transfer service, and the data transfer service provides responses from the queue associated with the data transfer client in response to the polling in a FIFO manner. The data transfer client can then decrypt the responses obtained from its queue and process the retrieved and decrypted legacy data, for example, by integrating the legacy data with other data into a virtual application, generating one or more graphical representations of the legacy data, providing one or more notifications based on the legacy data, or the like.

FIG. 1 depicts an exemplary embodiment of a computing system 100 suitable for performing secure asynchronous data transfer and related processes described herein to obtain data 111 residing behind a firewall 112 that logically separates and secures the data 111 from a network 114. The illustrated computing system 100 includes, without limitation, a server 102 that functions as an intermediary supporting data transfer between one or more requesting client devices 106 on a communications network 114 and a computing device 108 that resides behind the firewall 112 and is capable of accessing the requested data 111. In this regard, the communications network 114 may be realized as any sort or combination of wired and/or wireless computer network, a cellular network, a mobile broadband network, a radio network, the Internet, or the like, and the firewall 112 generally represents a security barrier that regulates communications between the computing device 108 and the network 114. Depending on the embodiment, the firewall 112 may be implemented as a physical barrier (e.g., a separate device between the computing device 108 and the network 114) or logical barrier (e.g., software on the computing device 108) to the network 114. While FIG. 1 depicts the firewall 112 as residing between the computing device 108 and network 114, in other embodiments, the firewall 112 may reside between networks 114, 116 to logically separate the networks 114, 116.

The server 102 generally represents a computing device, computing system or another combination of processing logic, circuitry, hardware, and/or other components configured to support the data transfer processes, tasks, operations, and/or functions described herein. In this regard, the server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to create, generate, or otherwise facilitate a data transfer service application 126 that supports the data transfer processes described herein. In one or more embodiments, the programming instructions also cause the processing system 120 to create, generate, or otherwise facilitate the application platform 124 that generates or otherwise provides instances of the virtual application at run-time (or "on-demand") based at least in part upon code and other data that is stored or otherwise maintained by the database 104, with the data transfer service application 126 being integrated or otherwise incorporated as part of the virtual application. Accordingly, for purposes of explanation but without limitation, the server 102 may alternatively be referred to herein as an application server 102. Depending on the embodiment, the memory 122 may be realized as a random access memory (RAM), read only memory (ROM), flash memory, magnetic or optical mass storage, or any other suitable non-transitory short or long term data storage or other computer-readable media, and/or any suitable combination thereof.

The client device 106 generally represents an electronic device coupled to the network 114 that may be utilized by a user to access the application platform 124 on the application server 102 to retrieve data from one or more databases 104, 110 via the network 114. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information provided by the application platform 124 along with a user input device, such as a touchscreen, a touch panel, a mouse, a joystick, a directional pad, a motion sensor, or the like, capable of receiving input from the user of the client device 106. The client device 106 executes a client data transfer application 107 (or data transfer client) that communicates with the data transfer service 126 on the server 102 via a networking protocol. In some embodiments, the client device 106 executes web browser or similar client application that contacts the application server 102 and/or application platform 124 using a networking protocol, such as the hypertext transport protocol (HTTP) or the like, to access or otherwise initiate an instance of a virtual application presented on the client device 106, with the data transfer client 107 being integrated with or invoked by the virtual application.

In exemplary embodiments, the database 104 stores or otherwise maintains encryption keys and other cryptographic information 134 associated with each instance of data transfer clients 107 and data transfer agents 109 supported within the system 100 to support exchanges of cryptographic information between data transfer clients 107 and data transfer agents 109 without direct communications between data transfer clients 107 and data transfer agents 109 via a firewall 112. The database 104 may also store or otherwise maintain security policy information 136 associated with respective instances of the data transfer clients 107 and/or data transfer agents 109, which, in turn may be utilized by data transfer agents 109 to authenticate, authorize, or otherwise allow request for data 111 behind the firewall 112. For example, the security policy information 136 may include permissions, authentication information, and/or other access control information associated with a user of the client device 106 that dictates what types of requests are permitted by that user, what data 111 can be accessed by and/or operated on pursuant to those requests, and the like. The security policy information 136 may also include information configured by an administrator associated with the firewalled devices 108, 110 and/or network 116 that limits or otherwise restricts requests or access to the data 111 independent of the user of the client device 106.

In one or more embodiments, the database 104 is realized as a multi-tenant database that is shared between multiple tenants, with each tenant having its own set of associated users, its own associated data 132 that is logically separate or otherwise isolated from data belonging to other tenants, and its own associated application code that may be integrated with the platform code to provide a customized tenant-specific user experience for users associated with that tenant. In such embodiments, the database 104 may store or otherwise maintain data and/or code associated with a number of different tenants and restricts each tenant's access to other tenants' data (or alternatively, restricts accessibility of each tenant's data with respect to other tenants). In some embodiments, the cryptographic information 134 and security policy information 136 may also be associated with particular tenants and maintained logically separate or otherwise isolated from such information associated with other tenants.

In exemplary embodiments, the computing device 108 generally represents a computing system or another combination of processing logic, circuitry, hardware, and/or other components residing behind the firewall 112 and configured to support the data transfer processes, tasks, operations, and/or functions described herein. For purposes of explanation but without limitation, the computing device 108 may alternatively be referred to herein as a firewalled server 108. In a similar manner as described above in the context of the application server 102, the firewalled server 108 includes a processing system that includes or otherwise accesses a data storage element (or memory) capable of storing programming instructions for execution by the processing system, that, when read and executed, cause processing system to create, generate, or otherwise facilitate a data transfer agent application 109 that supports the data transfer processes described herein.

Still referring to FIG. 1, in the illustrated embodiment, the firewalled server 108 is coupled to a database 110 via a communications network 116 that is logically separate from the network 114, such as, for example, a local area network. The database 110 stores data 111 that may be unavailable from the database 104 or otherwise inaccessible on the network 114 by virtue of the firewall 112, and for purposes of explanation, may alternatively be referred to herein as legacy data 111. Accordingly, for legacy data 111 to be obtained by a client device 106 on the network 114, it must be requested and transferred by the firewalled server 108 via the firewall 112.

In the illustrated embodiment, the database 104 maintains a plurality of queues 128, 130 associated with different entities 106, 108 within the computing system 100. In exemplary embodiments, for each instance of a data transfer agent 109, the database 104 maintains a queue 128 of requests received from instances of data transfer clients 107 that are intended for or directed to a particular data transfer agent 109. In this regard, requests for legacy data 111 from a firewalled server 108 and/or data transfer agent 109 are stored or otherwise maintained in a FIFO order in a queue data structure associated with the firewalled server 108 and/or data transfer agent 109 based on one or more destination address fields of the request. For example, requests from data transfer clients 107 may include an identifier associated with a data transfer agent 109 that indicates a particular data transfer agent 109 as a destination for servicing the request. In this regard, the queue 128 associated with the data transfer agent 109 may include requests from multiple different instances of data transfer clients 107 but does not include requests intended for other instances of data transfer agents 109.

Similarly, for each instance of a data transfer client 107, the database 104 maintains a queue 130 of responses received from instances of data transfer agents 109 that are intended for or directed to a respective data transfer client 107. In this regard, responses from a firewalled server 108 and/or data transfer agent 109 are stored or otherwise maintained in a FIFO order in a queue data structure associated with the data transfer client 107 that requested the legacy data 111 contained in the response based on one or more destination address fields of the response, for example, based on an identifier associated with a data transfer client 107 included with the response. Accordingly, a queue 130 associated with a particular data transfer client 107 may include responses from multiple different instances of data transfer agents 109 but does not include responses intended for other instances of data transfer clients 107.

It should be noted that FIG. 1 is a simplified representation of a computing system 100 for purposes of explanation and is not intended to be limiting. For example, although FIG. 1 depicts the queues 128, 130 being maintained in database 104, in various embodiments, one or more of the queues 128, 130 may be maintained in memory 122 integrated with the server 102. Similarly, although FIG. 1 depicts the cryptographic and security information 134, 136 residing on the database 104, in other embodiments, the memory 122 may maintain the cryptographic and security policy information 134, 136.

Figure 2:
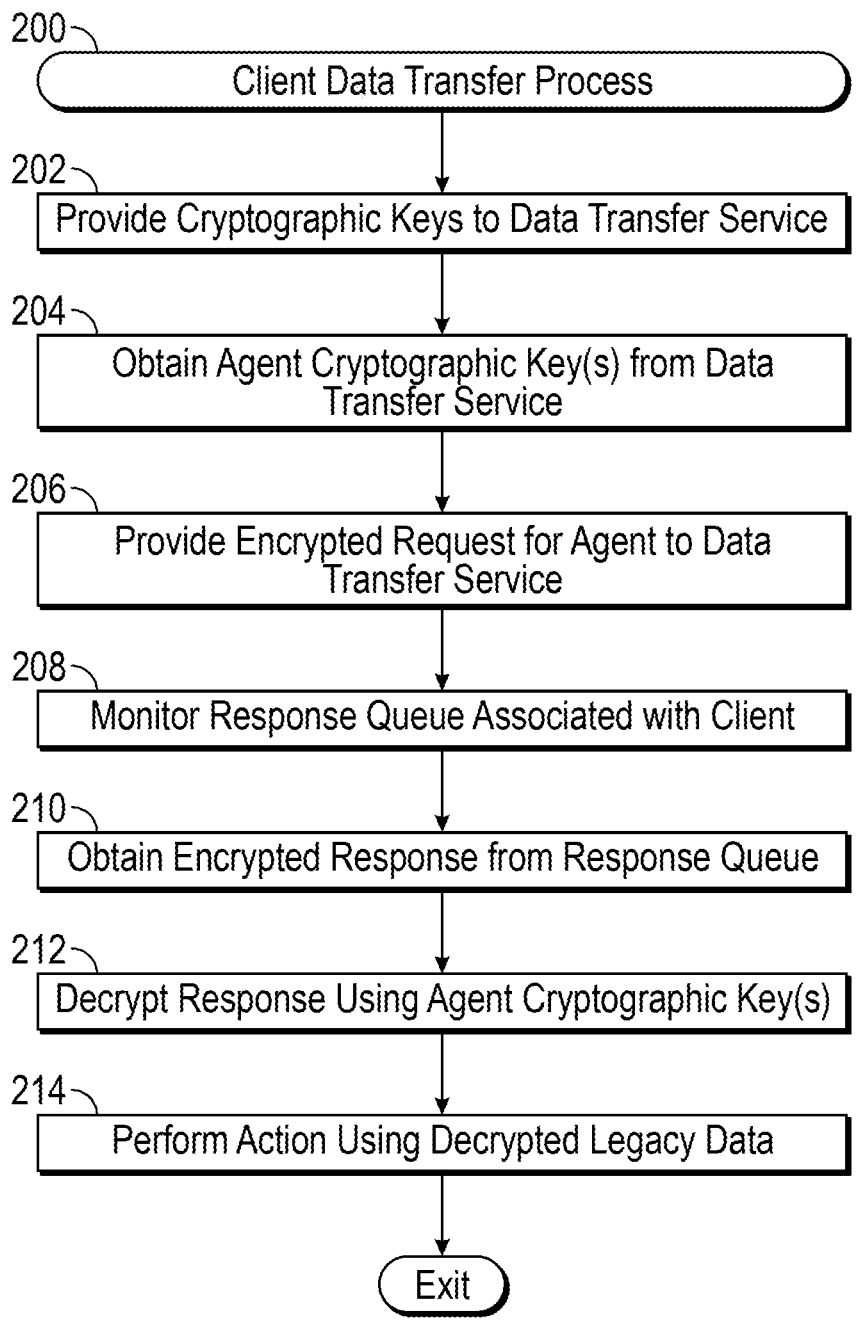
FIG. 2 is a flow diagram of an exemplary client data transfer process suitable for implementation at a client device in the computing system of FIG. 1 in accordance with one or more embodiments.

FIG. 2 depicts an exemplary embodiment of a client data transfer process 200 suitable for implementation in a computing system to request and receive data from behind a firewall. For illustrative purposes, the following description may refer to elements mentioned above in connection with FIG. 1. In this regard, while portions of the client data transfer process 200 may be performed by different elements of the computing system 100, for purposes of explanation, the subject matter is described herein primarily in the context of the client data transfer process 200 being performed by the data transfer client 107 at the client device 106. It should be appreciated that the client data transfer process 200 may include any number of additional or alternative tasks, the tasks need not be performed in the illustrated order and/or the tasks may be performed concurrently, and/or the client data transfer process 200 may be incorporated into a more comprehensive procedure or process having additional functionality not described in detail herein. Moreover, one or more of the tasks shown and described in the context of FIG. 2 could be omitted from a practical embodiment of the client data transfer process 200 as long as the intended overall functionality remains intact.

The illustrated client data transfer process 200 initializes or otherwise begins by transmitting or otherwise providing cryptographic keys or other cryptographic information to a data transfer service and receiving or otherwise obtaining cryptographic keys or other cryptographic information corresponding to a data transfer agent from which data will be requested from the data transfer service (tasks 202, 204). In this regard, the data transfer client 107 may initiate or otherwise perform a key exchange with the data transfer agent 109 indirectly via the data transfer service 126. For example, the data transfer client 107 may transmit or otherwise provide, to the data transfer service 126, one or more public keys that may be utilized to decrypt requests originating from the data transfer client 107. Additionally, the data transfer client 107 may request, from the data transfer service 126, one or more public keys that may be utilized to decrypt responses from a particular data transfer agent 109. Thus, the data transfer service 126 may store or otherwise maintain the public keys and any other cryptographic information 134 associated with data transfer entities 107, 109 in the database 104 to support the key exchange processes described herein.

In the illustrated embodiment, after the cryptographic key exchange, the client data transfer process 200 continues by transmitting or otherwise providing encrypted requests for legacy data from a particular data transfer agent to the data transfer service (task 206). In this regard, the data transfer client 107 may generate or otherwise construct a query that describes the subset of data 111 on the database 110 that the data transfer client 107 would like to retrieve (e.g., for integration into another application), and then encrypt the query using a private key belonging to the data transfer client 107 and the public key associated with the destination data transfer agent 109 that was obtained from the data transfer service 126, resulting in an encrypted request for data 111 from the data transfer agent 109 (alternatively referred to herein as an encrypted data request). The data transfer client 107 may also markup or tag the encrypted data request with one or more of its own identifiers along with one or more identifiers associated with the destination data transfer agent 109 before transmitting or otherwise providing the encrypted data request to the data transfer service 126 via the network 114. As described below, based on the identifier(s) for the data transfer agent 109 included in or with the request, the data transfer service 126 places the encrypted data request in the queue 128 associated with that identified data transfer agent 109.

Still referring to FIG. 2, the client data transfer process 200 continues by polling or otherwise monitoring a response queue associated with the data transfer client for any data transfer responses intended for the client (task 208). In this regard, the data transfer client 107 may periodically transmit a request for one or more responses from its associated response queue 130 to the data transfer service 126. The response requests may be sent periodically and asynchronously and/or independently of the encrypted data requests sent by the data transfer client 107. As described below, after servicing or executing a request, a data transfer agent 109 encrypts the retrieved subset of legacy data 111 using its associated private cryptographic key(s) and the public cryptographic key(s) associated with the destination data transfer client 107 that initiated the data request and transmits or the encrypted data response to the data transfer service 126 via the firewall 112 and network 114. The encrypted data response may be marked up, tagged, or otherwise include one or more identifiers associated with the data transfer agent 109 along with one or more identifiers associated with the destination data transfer client 107. The data transfer service 126 utilizes the identifier(s) associated with the destination data transfer client 107 to place an encrypted data response in the queue 130 associated with the intended data transfer client 107.

When a response exists in the client's response queue, the client data transfer process 200 receives or otherwise obtains one more encrypted responses from the data transfer service (task 210). In this regard, when at least one response exists in the response queue 130, the data transfer service 126 responds to a response request by transmitting up to the requested number of responses from the response queue 130 associated with the requesting data transfer client 107 to the data transfer client 107. The client data transfer process 200 continues by decrypting the received response(s) using the cryptographic information associated with the data transfer agent and performing one or more actions using the decrypted legacy data (tasks 212, 214). In this regard, using the identifier(s) associated with the data transfer agent 109 that is the source of the response, the data transfer client 107 locates the previously obtained public cryptographic key(s) associated with that data transfer agent 109 and decrypts the response using the data transfer agent's public cryptographic key(s) and the private cryptographic key(s) associated with the data transfer client 107 to obtain the unencrypted legacy data 111 that was requested. It should be noted that the keys used for decryption may be different from those used for encryption. Thereafter, the client device 106 and/or the data transfer client 107 performs one or more actions on or using the unencrypted legacy data 111, such as, for example, generating one or more graphical representations of the unencrypted legacy data 111 on a graphical user interface (GUI) display on the client device 106, generating one or more notifications based on a value of the unencrypted legacy data 111, providing the unencrypted legacy data 111 to a function associated with a virtual application for further processing, or the like.

Figure 3:
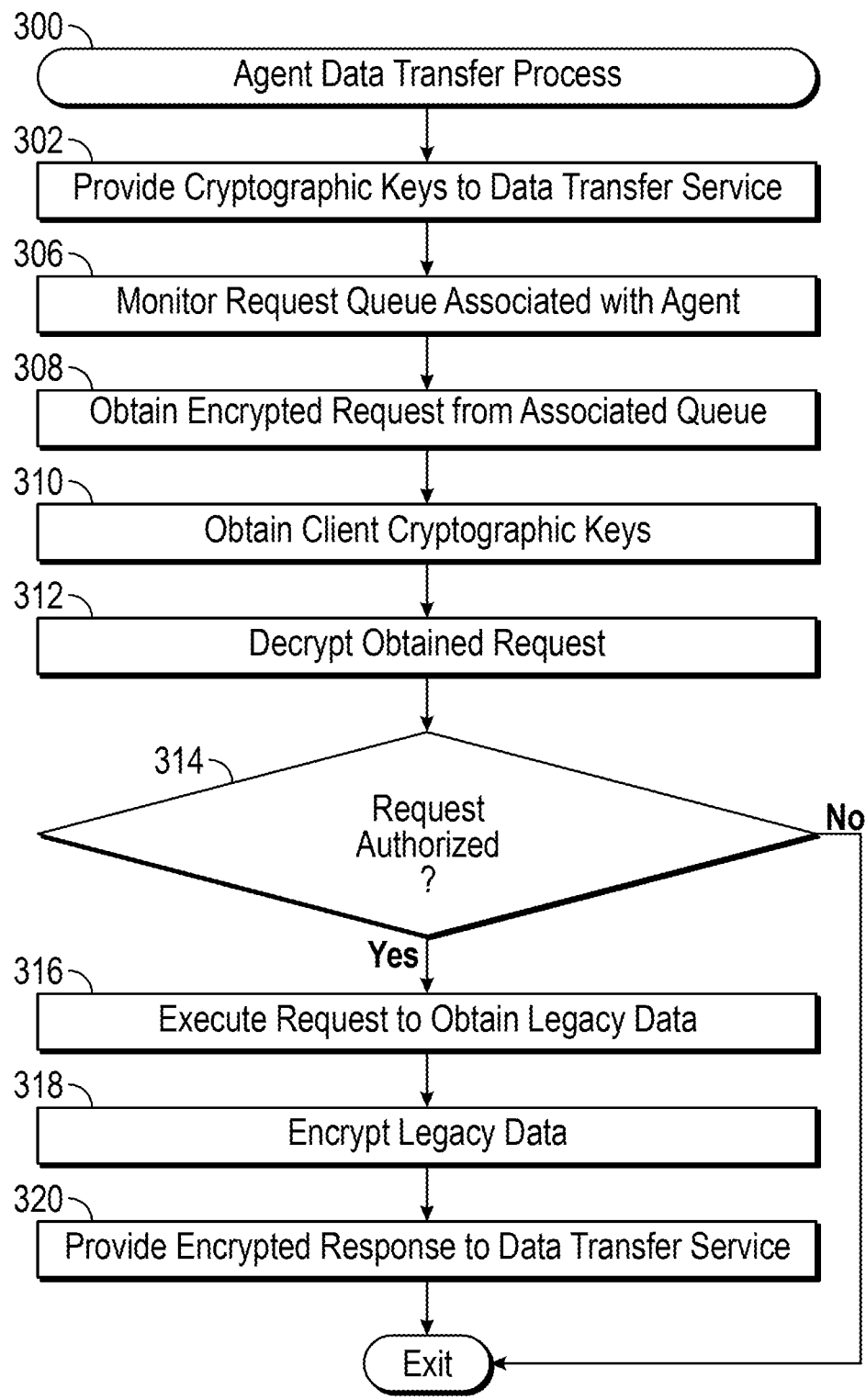
FIG. 3 is a flow diagram of an exemplary agent data transfer process suitable for implementation in the computing system of FIG. 1 in conjunction with the client data transfer process of FIG. 2 in accordance with one or more embodiments.

FIG. 3 depicts an exemplary embodiment of an agent data transfer process 300 suitable for implementation in a computing system to provide data from behind a firewall. For illustrative purposes, the following description may refer to elements mentioned above in connection with FIG. 1. In this regard, while portions of the agent data transfer process 300 may be performed by different elements of the computing system 100, for purposes of explanation, the subject matter is described herein primarily in the context of the agent data transfer process 300 being performed by the data transfer agent 109 at the firewalled server 108. It should be appreciated that the agent data transfer process 300 may include any number of additional or alternative tasks, the tasks need not be performed in the illustrated order and/or the tasks may be performed concurrently, and/or the agent data transfer process 300 may be incorporated into a more comprehensive procedure or process having additional functionality not described in detail herein. Moreover, one or more of the tasks shown and described in the context of FIG. 3 could be omitted from a practical embodiment of the agent data transfer process 300 as long as the intended overall functionality remains intact.

The illustrated agent data transfer process 300 initializes or otherwise begins by transmitting or otherwise providing cryptographic keys or other cryptographic information to a data transfer service (task 302). In this regard, to support encryption, upon instantiation, the data transfer agent 109 provides its public cryptographic information to the data transfer service 126, which stores or otherwise maintains the public keys and any other cryptographic information 134 associated with data transfer agent 109 in the database 104 to support the key exchange processes described herein.

The agent data transfer process 300 continues by polling or otherwise monitoring a request queue associated with the data transfer agent for any data transfer requests intended for the agent (task 304). For example, the data transfer agent 109 may periodically transmit, to the data transfer service 126, a request for one or more data requests from its associated request queue 128. Here, it should be noted that the firewall 112 allows the polling requests initiated by the data transfer agent 109 on the server 108 to pass through the firewall 112 for transmission to the data transfer service 126 over the network 114. The polling requests may be sent by the data transfer agent 109 periodically and asynchronously and/or independently of when the data requests are sent by data transfer clients 107. In one embodiment, the data transfer agent 109 polls the data transfer service 126 asynchronously after completing execution of one or more data transfer requests. For example, in some embodiments, the data transfer agent 109 may poll the data transfer service 126 to obtain multiple data transfer requests, execute or otherwise perform the requested data transfers, and then request another batch of data transfer requests.

When a request exists in the agent's request queue, the agent data transfer process 300 receives or otherwise obtains one more encrypted data requests from the data transfer service (task 306). In this regard, the data transfer service 126 provides encrypted data requests from the request queue 128 associated with the data transfer agent 109 over the network 114 in response to a polling request, thereby allowing the encrypted data requests to pass through the firewall 112 without any reconfiguration of the firewall 112. For each request, the agent data transfer process 300 obtains the cryptographic key(s) or other information associated with the requesting data transfer client and decrypts the data request (tasks 308, 310). If the data transfer agent 109 has not already obtained the public cryptographic key(s) associated with the requesting data transfer client 107, the data transfer agent 109 utilizes the identifier(s) associated with the requesting data transfer client 107 to obtain that client's cryptographic information 134 from the database 104 via the data transfer service 126. Again, by virtue of the request for cryptographic information 134 initiating at the firewalled server 108, the request and response provided by the data transfer service 126 are allowed to pass through the firewall 112 for communication over the network 114. The data transfer agent 109 utilizes the public cryptographic key(s) associated with the data transfer client 107 associated with a request to be executed and its own private cryptographic key(s) to decrypt the request after the request has passed through the firewall 112, thereby ensuring the request is exposed during communications on the network 114.

After decrypting a request, the agent data transfer process 300 continues by receiving or otherwise obtaining security policy information associated with the data transfer client and/or the data transfer agent and verifies the request is authorized prior to execution (tasks 312, 314). In this regard, the data transfer agent 109 may verify that the type of query or request is allowed to be performed by the data transfer agent 109, that the type of query or request is allowed to be performed on behalf of the data transfer client 107, that a user associated with the data transfer client 107 is authenticated and/or authorized to access the requested data, and the like. Again, the data transfer agent 109 may request the appropriate security policy information associated with the data transfer agent 109, the data transfer client 107, and/or the data transfer agent's tenant from the data transfer service 126, which obtains the security policy information 136 to be implemented from the database 104 and provides it back to the data transfer agent 109 through the firewall 112. In some embodiments, the data transfer agent 109 may store the security policy information at the server 108, the database 110 and/or elsewhere on the network 116 for convenient reference and periodically poll the data transfer service 126 for updated security policy information on a regular basis. Thus, security policy information may be managed and updated by an administrator associated with the firewalled server 108 and/or the firewalled network 116 using an instance of a client device 106 on the network 114.

When the request is authorized and allowed, the agent data transfer process 300 continues by executing the request to obtain the requested subset of legacy data, encrypting the retrieved legacy data, and transmitting or otherwise providing the encrypted response to the data transfer service (tasks 316, 318, 320). For example, the data transfer agent 109 may provide a query statement corresponding to the request to the database 110 via the network 116, which, in turn results in the database 110 providing the corresponding subset of legacy data 111 back to the data transfer agent 109 over the network 116. Depending on the embodiment, the query statement may be contained within the request or generated by the data transfer agent 109 based on the request. The data transfer agent 109 then utilizes its private cryptographic key(s) and the public cryptographic key(s) associated with the requesting data transfer client 107 to encrypt the retrieved legacy data 111 and then transmits the encrypted response to the data transfer service 126 via the firewall 112 and network 114. As described above, the encrypted response may be marked up, tagged, or otherwise include the identifier(s) associated with the data transfer client 107 that initiated the request being responded to, thereby allowing the data transfer service 126 to maintain the encrypted response in the response queue 130 associated with that particular data transfer client 107.

Figure 4:
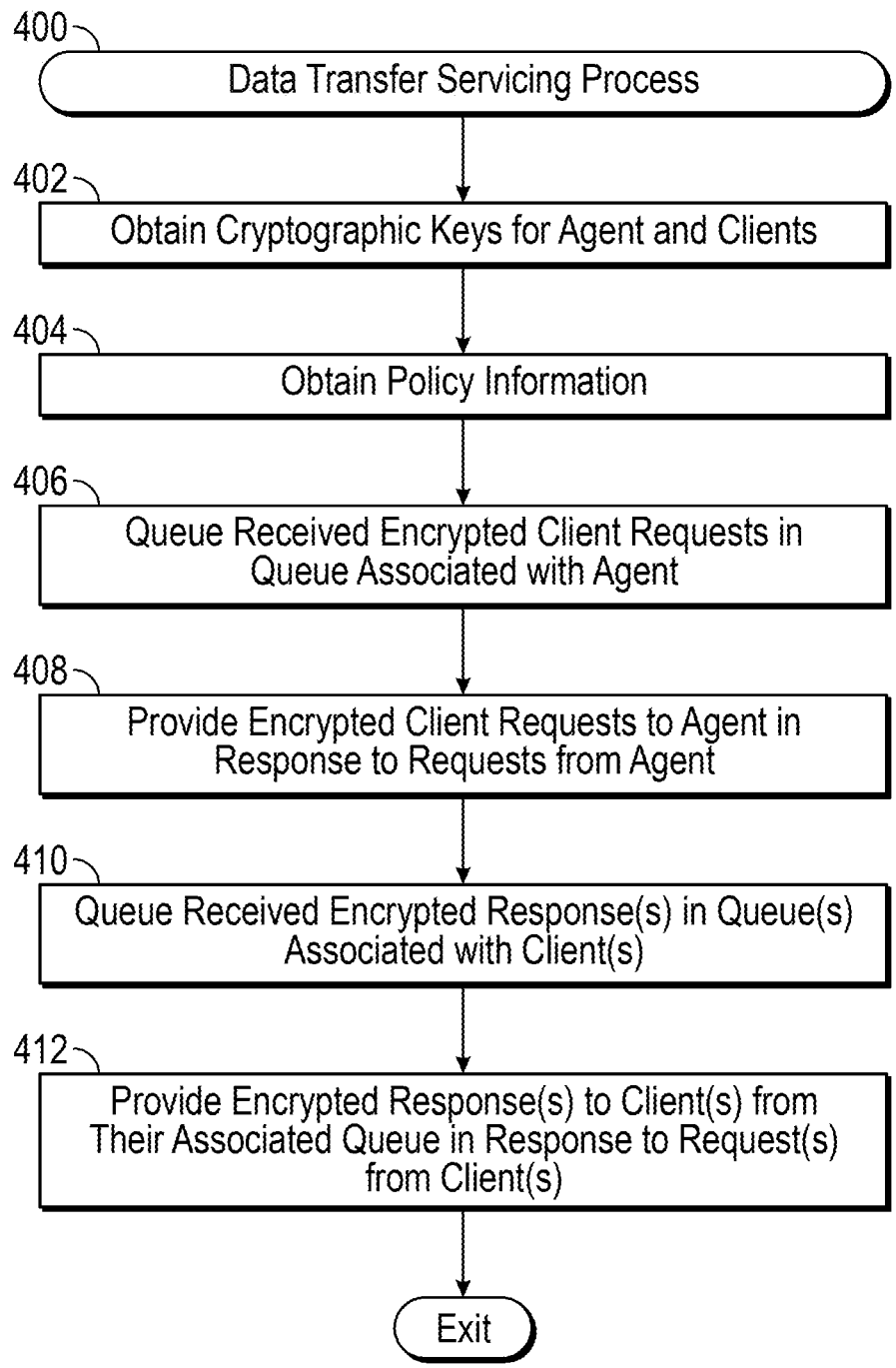
FIG. 4 is a flow diagram of an exemplary data transfer servicing process suitable for implementation in the computing system of FIG. 1 in conjunction with the client data transfer process of FIG. 2 and the agent data transfer process of FIG. 3 in accordance with one or more embodiments.

FIG. 4 depicts an exemplary embodiment of a data transfer servicing process 400 suitable for implementation in a computing system to support data transfers between entities on different sides of a firewall via an intermediary. For illustrative purposes, the following description may refer to elements mentioned above in connection with FIG. 1. In this regard, while portions of the data transfer servicing process 400 may be performed by different elements of the computing system 100, for purposes of explanation, the subject matter is described herein primarily in the context of the data transfer servicing process 400 being performed by the data transfer service 126 at the server 102. It should be appreciated that the data transfer servicing process 400 may include any number of additional or alternative tasks, the tasks need not be performed in the illustrated order and/or the tasks may be performed concurrently, and/or the data transfer servicing process 400 may be incorporated into a more comprehensive procedure or process having additional functionality not described in detail herein. Moreover, one or more of the tasks shown and described in the context of FIG. 4 could be omitted from a practical embodiment of the data transfer servicing process 400 as long as the intended overall functionality remains intact.

The illustrated data transfer servicing process 400 initialized by receiving or obtaining public keys and other public cryptographic information for entities to be supported by the data transfer service (task 402). In this regard, the data transfer service 126 receives public cryptographic information associated with entities 107, 109 and stores the encryption information 134 in the database 104 for subsequent provisioning to entities 107, 109 in response to requests as described above. Additionally, the illustrated data transfer servicing process 400 receives or obtains security policy information to be implemented by data transfer agents (task 404). In such embodiments, the data transfer service 126 receives security policy information 136 regulating access to legacy data 111 from an administrator associated with the firewalled server 108 and/or network 116 where the legacy data 111 resides from an instance of a client device on the network 114 or residing behind the firewall 112 on the network 116. The data transfer service 126 also stores the security policy information 136 in the database 104 for subsequent provisioning to data transfer agents 109 in response to requests as described above.

The data transfer servicing process 400 continues by queueing encrypted data requests received from data transfer clients in queues associated with the respective data transfer agents supported by the data transfer service, and in response to polling for the requests by a data transfer agent, providing encrypted data requests from the queue associated with that particular data transfer agent to the data transfer agent (tasks 406, 408). As described above, the data transfer service 126 queues encrypted requests received from different instances of data transfer clients 107 that are directed towards a common instance of a data transfer agent 109 in a queue 128 associated with that data transfer agent 109 and provides those queued requests to that data transfer agent 109 in a FIFO manner in response to polling requests from that data transfer agent 109, as described above. The data transfer service 126 may also provide encryption information 134 and/or security policy information 136 from the database 104 to the data transfer agent 109 in connection with providing the encrypted data requests to the data transfer agent 109. It should be noted that the data transfer service 126 providing encrypted data requests from an agent's queue 128 to that particular data transfer agent 109 is not synchronous with and is independent of the data transfer service 126 receiving and queueing encrypted data requests. That is, the data transfer service 126 providing encrypted data requests from an agent's queue 128 is initiated or otherwise driven by a request from that particular data transfer agent 109, which could be received substantially immediately after queueing an encrypted data request or at any subsequent time in the future, depending on system loading, network availability, or other conditions that may impact the ability of the data transfer agent 109 to poll for and/or service queued data requests.

The data transfer servicing process 400 also queues encrypted responses received from data transfer agents in queues associated with the respective data transfer clients supported by the data transfer service, and in response to polling for the responses by a data transfer client, providing encrypted responses from the queue associated with that particular data transfer client to the data transfer client (tasks 410, 412). As described above, the data transfer service 126 queues encrypted responses received from one or more instances of data transfer agent 109 that are directed towards a common instance of a data transfer client 107 in a response queue 130 associated with that data transfer client 107 and provides those queued responses to that data transfer client 107 in response to polling requests from that data transfer client 107, as described above. The polling requests from the data transfer client 107 may be independent of and asynchronous with respect to the polling requests received from the data transfer agents 109 as described above.

Figure 5:
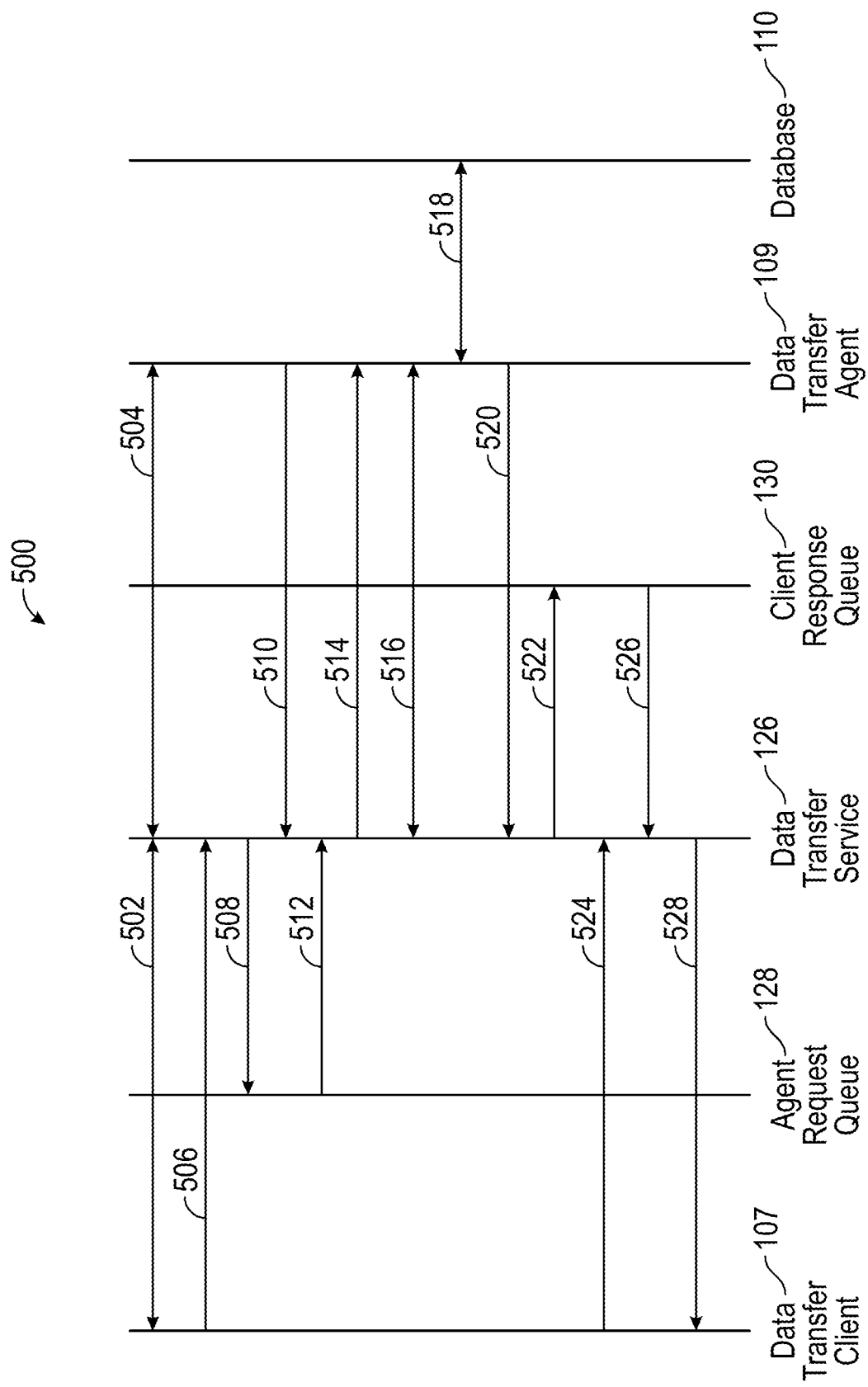
FIG. 5 depicts a illustrating a sequence of communications within the computing system of FIG. 1 in accordance with one exemplary embodiment of the processes of FIGS. 2-4.

FIG. 5 depicts an exemplary sequence 500 of communications within the computing system 100 of FIG. 1 in accordance with one or more embodiments of the data transfer processes 200, 300, 400 described above in the context of FIGS. 2-4. The depicted sequence 500 begins with the endpoint entities 107, 109 of the data transfer communicating 502, 504 with an intermediary data transfer service 126 to exchange cryptographic information. In this regard, the data transfer client 107 communicates 502 with the data transfer service 126 over the network 114 to provide public encryption information associated with the data transfer client 107 to the data transfer service 126 and receive, from the data transfer service 126, public encryption information associated with a data transfer agent 109 from which data is to be requested. The data transfer client 107 then utilizes the public encryption information associated with the data transfer agent 109 to encrypt data requests and decrypt responses. Similarly, the data transfer agent 109 communicates 504 with the data transfer service 126 over the network 114 via the firewall 112 to provide public encryption information associated with the data transfer agent 109 to the data transfer service 126 and receive, from the data transfer service 126, public encryption information associated with a data transfer client 107 requesting data from the data transfer agent 109. As described above, by virtue of the data transfer agent 109 initiating the communications 504, the public encryption information associated with the data transfer client 107 can be communicated via the firewall 112. It should be noted that although FIG. 5 depicts the exchanges 502, 504 of encryption information occurring substantially contemporaneously, in practice, the communications 502, 504 may be asynchronous and occur at different times independent of one another, and the respective timings of the communications 502, 504 may vary depending on system loading, network capabilities, or other factors.

The sequence 500 continues with the data transfer client 107 transmitting 506, to the data transfer service 126, an encrypted data request directed to the data transfer agent 109, and the data transfer service 126 inserting 508 the encrypted data request in the request queue 128 associated with the data transfer agent 109. As described above, the data transfer agent 109 asynchronously transmits 510 a polling request for client data requests to the data transfer service 126, which, in turn, retrieves 512 the encrypted data request directed to the data transfer agent 109 from the agent's request queue 128 and transmits 514 the encrypted data request from the queue 128 to the data transfer agent 109 in response to the polling request 510, thereby allowing the encrypted data request to pass through the firewall 112. In the illustrated sequence 500, after decrypting the client data request, the data transfer agent 109 communicates 516 with the data transfer service 126 to retrieve security policy information 136 for authorizing the request.

When the request is valid and authorized, the data transfer agent 109 queries 518 the database 110 over the network 116 to obtain the subset of legacy data 111 corresponding to the client data request. The data transfer agent 109 encrypts the legacy data 111 using the public cryptographic information associated with the data transfer client 107 and transmits 520 the encrypted response to the client data request to the data transfer service 126, which inserts 522 the encrypted response in a response queue 130 associated with the data transfer client 107 that the response is directed to. The data transfer client 107 asynchronously transmits 524 a polling request for responses to the data transfer service 126, which, in turn, retrieves 526 the encrypted response from the client's response queue 130 and transmits 528 the encrypted response from the queue 130 to the data transfer client 107. The data transfer client 107 may then decrypt the response using the public cryptographic information associated with the data transfer agent 109 to obtain the requested subset of legacy data 111 for subsequent processing and utilization at the client device 106.

Figure 6:
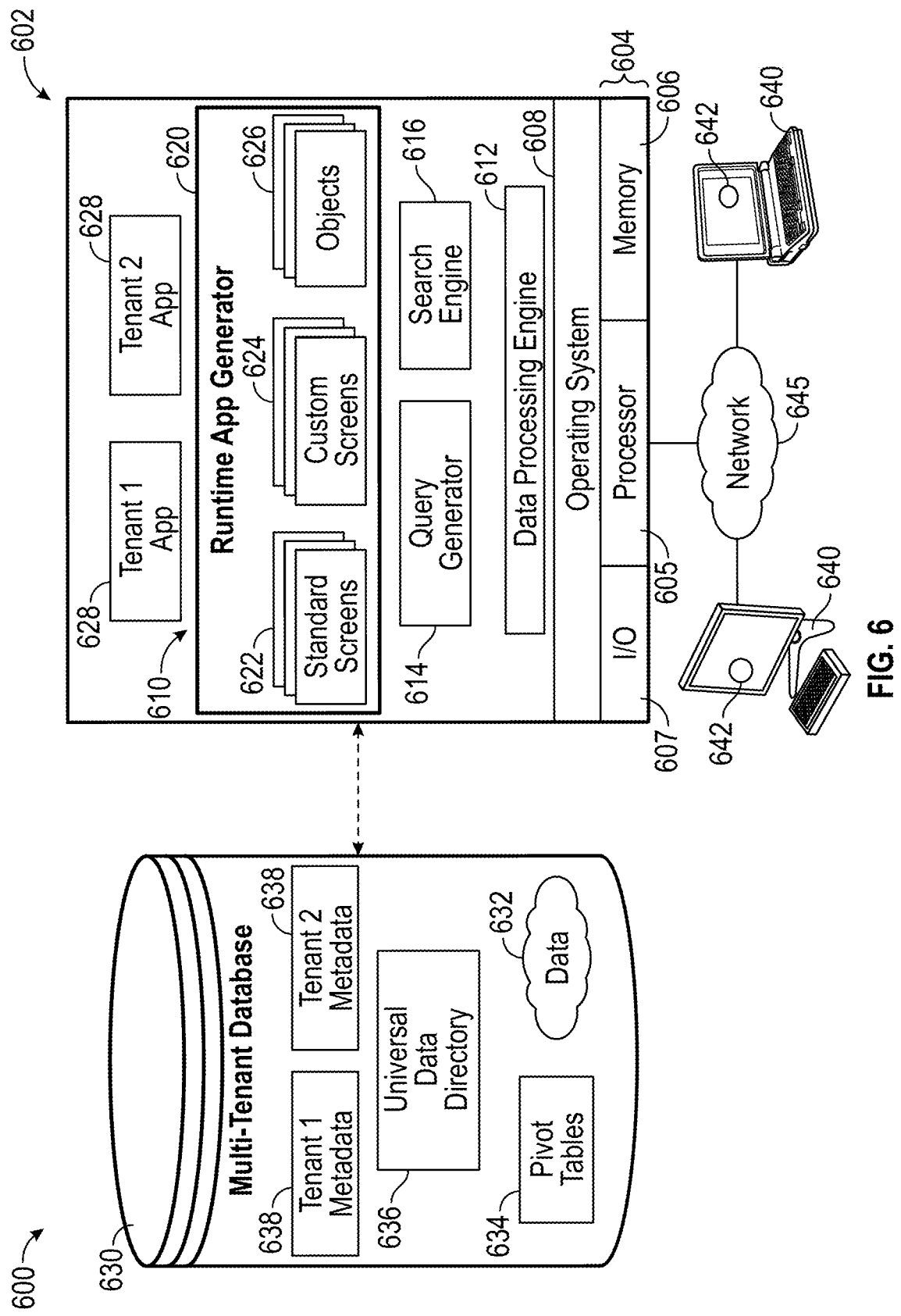
FIG. 6 is a block diagram of an exemplary multi-tenant system suitable for use with the computing system of FIG. 1 in conjunction with one or more of the processes of FIGS. 2-5 in accordance with one or more embodiments.

FIG. 6 depicts an exemplary embodiment of an on-demand multi-tenant database system 600 suitable for use with the processes of FIGS. 2-4 in the computing system 100 of FIG. 1. The illustrated multi-tenant system 600 of FIG. 6 includes a server 602, such as server 102, that dynamically creates and supports virtual applications 628 based upon data 632 from a common database 630 (e.g., database 104) that is shared between multiple tenants, alternatively referred to herein as a multi-tenant database. In this regard, the server 602 may support the data transfer servicing process 400 of FIG. 4 to support retrieval and integration of legacy data residing behind firewalls into instances of virtual applications 628, where data and services generated by the virtual applications 628 are provided via a network 645 (e.g., network 114) to any number of client devices 640 (e.g., client device 106, or the like), as desired. In such embodiments, the server 602 may support a data queueing and transferring service such as data transfer service 126 and persistently maintain instances of agent and client queues 128, 130 in the database 630 or its own associated memory 606.

In one or more embodiments, each virtual application 628 is suitably generated at run-time (or on-demand) using a common application platform 610 that securely provides access to the data 632 in the database 630 for each of the various tenants subscribing to the multi-tenant system 600 in addition to legacy data that may reside at or behind other locations on the network 645 in conjunction with the data transfer processes described herein. In accordance with one non-limiting example, the multi-tenant system 600 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 630. In this regard, each tenant includes one or more users associated with, assigned to, or otherwise belonging to that respective tenant. To put it another way, each respective user within the multi-tenant system 600 is associated with, assigned to, or otherwise belongs to a particular tenant of the plurality of tenants supported by the multi-tenant system 600. Tenants may represent customers, customer departments, business or legal organizations, and/or any other entities that maintain data for particular sets of users within the multi-tenant system 600 (i.e., in the multi-tenant database 630). For example, the application server 602 may be associated with one or more tenants supported by the multi-tenant system 600. Although multiple tenants may share access to the server 602 and the database 630, the particular data and services provided from the server 602 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 632 belonging to or otherwise associated with other tenants.

The multi-tenant database 630 is any sort of repository or other data storage system capable of storing and managing the data 632 associated with any number of tenants. The database 630 may be implemented using any type of conventional database server hardware. In various embodiments, the database 630 shares processing hardware 604 with the server 602. In other embodiments, the database 630 is implemented using separate physical and/or virtual database server hardware that communicates with the server 602 to perform the various functions described herein. In an exemplary embodiment, the database 630 includes a database management system or other equivalent software capable of determining an optimal query plan for retrieving and providing a particular subset of the data 632 to an instance of virtual application 628 in response to a query initiated or otherwise provided by a virtual application 628. The multi-tenant database 630 may alternatively be referred to herein as an on-demand database, in that the multi-tenant database 630 provides (or is available to provide) data at run-time to on-demand virtual applications 628 generated by the application platform 610.

In practice, the data 632 may be organized and formatted in any manner to support the application platform 610. In various embodiments, the data 632 is suitably organized into a relatively small number of large data tables to maintain a semi-amorphous "heap"-type format. The data 632 can then be organized as needed for a particular virtual application 628. In various embodiments, conventional data relationships are established using any number of pivot tables 634 that establish indexing, uniqueness, relationships between entities, and/or other aspects of conventional database organization as desired. Further data manipulation and report formatting is generally performed at run-time using a variety of metadata constructs. Metadata within a universal data directory (UDD) 636, for example, can be used to describe any number of forms, reports, workflows, user access privileges, business logic and other constructs that are common to multiple tenants. Tenant-specific formatting, functions and other constructs may be maintained as tenant-specific metadata 638 for each tenant, as desired. Rather than forcing the data 632 into an inflexible global structure that is common to all tenants and applications, the database 630 is organized to be relatively amorphous, with the pivot tables 634 and the metadata 638 providing additional structure on an as-needed basis. To that end, the application platform 610 suitably uses the pivot tables 634 and/or the metadata 638 to generate "virtual" components of the virtual applications 628 to logically obtain, process, and present the relatively amorphous data 632 from the database 630.

The server 602 is implemented using one or more actual and/or virtual computing systems that collectively provide the dynamic application platform 610 for generating the virtual applications 628. For example, the server 602 may be implemented using a cluster of actual and/or virtual servers operating in conjunction with each other, typically in association with conventional network communications, cluster management, load balancing and other features as appropriate. The server 602 operates with any sort of conventional processing hardware 604, such as a processor 605, memory 606, input/output features 607 and the like. The input/output features 607 generally represent the interface(s) to networks (e.g., to the network 645, or any other local area, wide area or other network), mass storage, display devices, data entry devices and/or the like. The processor 605 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 606 represents any non-transitory short or long term storage or other computer-readable media capable of storing programming instructions for execution on the processor 605, including any sort of random access memory (RAM), read only memory (ROM), flash memory, magnetic or optical mass storage, and/or the like. The computer-executable programming instructions, when read and executed by the server 602 and/or processor 605, cause the server 602 and/or processor 605 to create, generate, or otherwise facilitate the application platform 610 and/or virtual applications 628 and perform one or more additional tasks, operations, functions, and/or processes described herein. It should be noted that the memory 606 represents one suitable implementation of such computer-readable media, and alternatively or additionally, the server 602 could receive and cooperate with external computer-readable media that is realized as a portable or mobile component or application platform, e.g., a portable hard drive, a USB flash drive, an optical disc, or the like.

The application platform 610 is any sort of software application or other data processing engine that generates the virtual applications 628 that provide data and/or services to the client devices 640. In a typical embodiment, the application platform 610 gains access to processing resources, communications interfaces and other features of the processing hardware 604 using any sort of conventional or proprietary operating system 608. The virtual applications 628 are typically generated at run-time in response to input received from the client devices 640. For the illustrated embodiment, the application platform 610 includes a bulk data processing engine 612, a query generator 614, a search engine 616 that provides text indexing and other search functionality, and a runtime application generator 620. Each of these features may be implemented as a separate process or other module, and many equivalent embodiments could include different and/or additional features, components or other modules as desired.

The runtime application generator 620 dynamically builds and executes the virtual applications 628 in response to specific requests received from the client devices 640. The virtual applications 628 are typically constructed in accordance with the tenant-specific metadata 638, which describes the particular tables, reports, interfaces and/or other features of the particular application 628. In various embodiments, each virtual application 628 generates dynamic web content that can be served to a browser or other client program 642 associated with its client device 640, as appropriate.

The runtime application generator 620 suitably interacts with the query generator 614 to efficiently obtain multi-tenant data 632 from the database 630 as needed in response to input queries initiated or otherwise provided by users of the client devices 640. In a typical embodiment, the query generator 614 considers the identity of the user requesting a particular function (along with the user's associated tenant), and then builds and executes queries to the database 630 using system-wide metadata 636, tenant specific metadata 638, pivot tables 634, and/or any other available resources. The query generator 614 in this example therefore maintains security of the common database 630 by ensuring that queries are consistent with access privileges granted to the user and/or tenant that initiated the request. In this manner, the query generator 614 suitably obtains requested subsets of data 632 accessible to a user and/or tenant from the database 630 as needed to populate the tables, reports or other features of the particular virtual application 628 for that user and/or tenant.

Still referring to FIG. 6, the data processing engine 612 performs bulk processing operations on the data 632 such as uploads or downloads, updates, online transaction processing, and/or the like. In many embodiments, less urgent bulk processing of the data 632 can be scheduled to occur as processing resources become available, thereby giving priority to more urgent data processing by the query generator 614, the search engine 616, the virtual applications 628, etc.

In exemplary embodiments, the application platform 610 is utilized to create and/or generate data-driven virtual applications 628 for the tenants that they support. Such virtual applications 628 may make use of interface features such as custom (or tenant-specific) screens 624, standard (or universal) screens 622 or the like. Any number of custom and/or standard objects 626 may also be available for integration into tenant-developed virtual applications 628. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 626 such as "account" objects, "opportunity" objects, "contact" objects, or the like. The data 632 associated with each virtual application 628 is provided to the database 630, as appropriate, and stored until it is requested or is otherwise needed, along with the metadata 638 that describes the particular features (e.g., reports, tables, functions, objects, fields, formulas, code, etc.) of that particular virtual application 628. For example, a virtual application 628 may include a number of objects 626 accessible to a tenant, wherein for each object 626 accessible to the tenant, information pertaining to its object type along with values for various fields associated with that respective object type are maintained as metadata 638 in the database 630. In this regard, the object type defines the structure (e.g., the formatting, functions and other constructs) of each respective object 626 and the various fields associated therewith.

Still referring to FIG. 6, the data and services provided by the server 602 can be retrieved using any sort of personal computer, mobile telephone, tablet or other network-enabled client device 640 on the network 645. In an exemplary embodiment, the client device 640 includes a display device, such as a monitor, screen, or another conventional electronic display capable of graphically presenting data and/or information retrieved from the multi-tenant database 630. Typically, the user operates a conventional browser application or other client program 642 (e.g., client application 107) executed by the client device 640 to contact the server 602 via the network 645 using a networking protocol, such as the hypertext transport protocol (HTTP) or the like. The user typically authenticates his or her identity to the server 602 to obtain a session identifier ("SessionID") that identifies the user in subsequent communications with the server 602. When the identified user requests access to a virtual application 628, the runtime application generator 620 suitably creates the application at run time based upon the metadata 638, as appropriate. As noted above, the virtual application 628 may contain Java, ActiveX, or other content that can be presented using conventional client software running on the client device 640; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to cryptography, firewalls, queueing, authorization, authentication, access controls, querying and other database functions, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method comprising:
   receiving, at a server coupled to a network, an encrypted request for data behind a firewall from a data transfer client executing on a first computing device coupled to the network;
   maintaining the encrypted request in a first queue of requests associated with a data transfer agent executing on a second computing device residing behind the firewall, wherein the second computing device is coupled to the network via the firewall;
   providing, by the server, the encrypted request from the first queue to the data transfer agent via the network in response to a second request received from the data transfer agent via the network;
   providing, by the server, a public key associated with the data transfer client to the data transfer agent residing behind the firewall in response to a third request received from the data transfer agent via the network, wherein the data transfer agent decrypts the encrypted request using the public key associated with the data transfer client provided by the server prior to processing the encrypted request to obtain a first response comprising the data;
   receiving, at the server, the first response from the data transfer agent via the network;
   maintaining the first response in a second queue of responses associated with the data transfer client; and
   providing, by the server, the first response from the second queue to the data transfer client via the network in response to a fourth request received from the data transfer client via the network.

2. The method of claim 1, further comprising providing, by the server, security policy information to the data transfer agent via the network in response to a fifth request received from the data transfer agent via the network, wherein the data transfer agent authorizes the encrypted request based on the security policy information after the decryption of the encrypted request and prior to execution of the encrypted request.

3. The method of claim 1, further comprising providing, by the server, security policy information to the data transfer agent via the network in response to the third request received from the data transfer agent via the network, wherein the data transfer agent authorizes the encrypted request based on the security policy information prior to execution of the encrypted request.

4. The method of claim 1, wherein:
   the data transfer agent encrypts the first response;
   maintaining the first response in the second queue comprises maintaining the encrypted first response in the second queue; and
   providing the first response comprises providing the encrypted first response to the data transfer client.

5. The method of claim 4, further comprising providing, by the server, second cryptographic information associated with the data transfer agent to the data transfer client via the network in response to a fifth request received from the data transfer client via the network, wherein the data transfer client decrypts the encrypted first response using the second cryptographic information associated with the data transfer agent.

6. The method of claim 1, further comprising providing, by the server, an instance of a virtual application on the first computing device, wherein decrypted data of the first response is integrated into the virtual application.

7. The method of claim 1, wherein the encrypted request, the second request, the third request, and the fourth request are asynchronous.

8. A non-transitory computer-readable medium having instructions stored thereon that are executable by a processing system of the server to perform the method of claim 1.

9. A computing system comprising:
   a data transfer agent executing on a computing device coupled to a network via a firewall;
   a database to maintain a first queue of requests for the data transfer agent and a second queue of responses to one or more of the requests; and
   a server coupled to the database and the network to provide an encrypted request for data behind the firewall from a data transfer client from the first queue of requests to the data transfer agent residing behind the firewall via the network in response to receiving a second request from the data transfer agent via the firewall, provide a public key associated with the data transfer client to the data transfer agent residing behind the firewall via the network in response to a third request from the data transfer agent, and add a first response received from the data transfer agent via the network to the second queue of responses, wherein the data transfer agent decrypts the encrypted request using the public key associated with the data transfer client provided by the server prior to processing the encrypted request to obtain a result comprising the data and encrypts the result to obtain the first response provided to the server.

10. The computing system of claim 9, the database maintaining security policy information, wherein:
    the server provides the security policy information to the data transfer agent in response to a fourth request from the data transfer agent; and
    the data transfer agent authorizes the encrypted request after decryption and prior to executing the encrypted request.

11. The computing system of claim 9, wherein the data transfer agent encrypts the result using the public key associated with the data transfer client.

12. The computing system of claim 9, the data transfer client executing on a second computing device coupled to the network and providing the encrypted request to the server via the network, the second queue of responses being associated with the data transfer client, wherein the server provides the first response from the second queue of responses to the data transfer client via the network in response to receiving a fourth request from the data transfer client.

13. The computing system of claim 12, the database maintaining second cryptographic information associated with the data transfer agent, wherein:
the server provides the second cryptographic information associated with the data transfer agent to the data transfer client in response to a fifth request from the data transfer client; and
the data transfer client decrypts the first response using the second cryptographic information associated with the data transfer agent.

14. The method of claim 1, wherein:
receiving the encrypted request comprises receiving, by a data transfer service at the server, the encrypted request for the data behind the firewall from the data transfer client on the network;
maintaining the encrypted request comprises queueing, by the data transfer service, the encrypted request in the first queue associated with the data transfer agent behind the firewall;
providing the encrypted request comprises providing, by the data transfer service, the encrypted request to the data transfer agent via the firewall in response to a polling request for queued requests from the data transfer agent, the data transfer agent transmitting the polling request via the firewall, wherein the data transfer service decrypts the encrypted request and executes the decrypted request to retrieve the data;
receiving the first response comprises receiving, by the data transfer service, an encrypted response from the data transfer agent via the firewall, wherein the encrypted response includes the data;
maintaining the first response comprises queueing, by the data transfer service, the encrypted response in the second queue associated with the data transfer client; and
providing the first response comprises providing, by the data transfer service, the encrypted response to the data transfer client in response to a second polling request for queued requests from the data transfer client, wherein the data transfer client decrypts the encrypted response to obtain the data.

15. The method of claim 14, further comprising exchanging, via the data transfer service, cryptographic information between the data transfer client and the data transfer agent, the cryptographic information including the public key associated with the data transfer client and a public key associated with the data transfer agent, wherein:
the data transfer client generates the encrypted request using the public key associated with the data transfer agent;
the data transfer agent generates the encrypted response using the public key associated with the data transfer client; and
the data transfer client decrypts the encrypted response using the public key associated with the data transfer agent.

16. The method of claim 14, wherein receiving the encrypted request and receiving the polling request are asynchronous.

17. The method of claim 14, wherein receiving the polling request and receiving the encrypted response are asynchronous.

18. The computing system of claim 9, wherein:
the public key comprises a public cryptographic key associated with the data transfer client;
the encrypted request is encrypted using a private cryptographic key associated with the data transfer client and a second public cryptographic key associated with the data transfer agent;
the data transfer agent decrypts the first request behind the firewall using the public cryptographic key associated with the data transfer client and a second private cryptographic key associated with the data transfer agent;
the data transfer agent encrypts the first response behind the firewall using the public cryptographic key associated with the data transfer client and the second private cryptographic key associated with the data transfer agent; and
the data transfer client decrypts the first response using the second public cryptographic key associated with the data transfer agent and the private cryptographic key associated with the data transfer client.

* * * * *